(12) United States Patent
Niratsuka et al.

(10) Patent No.: US 6,366,767 B1
(45) Date of Patent: Apr. 2, 2002

(54) LOCAL OSCILLATION CIRCUIT AND A RECEIVING CIRCUIT INCLUDING THE LOCAL OSCILLATION CIRCUIT

(75) Inventors: Kimitoshi Niratsuka; Kunihiko Gotoh, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/309,710

(22) Filed: May 11, 1999

(30) Foreign Application Priority Data

Nov. 12, 1998 (JP) .......................................... 10-322612

(51) Int. Cl.[7] ................................................ H04B 1/06
(52) U.S. Cl. ........................ 455/255; 455/258; 455/259; 455/318; 331/74
(58) Field of Search ................................ 455/264, 255, 455/256, 258, 259, 268, 118, 318; 331/74

(56) References Cited

U.S. PATENT DOCUMENTS 5,731,742 A * 3/1998 Wojewoda et al. ........... 331/44
5,758,265 A * 5/1998 Okanobu ....................... 455/76
5,893,027 A * 4/1999 Brueske ....................... 455/118
6,066,991 A * 5/2000 Naito et al. .................... 331/75
6,075,979 A * 6/2000 Holtvoeth et al. ........... 455/264

FOREIGN PATENT DOCUMENTS

JP              9-205383            8/1997

* cited by examiner

Primary Examiner—Daniel Hunter
Assistant Examiner—Lana Le
(74) Attorney, Agent, or Firm—Armstrong, Westerman & Hattori, LLP

(57) ABSTRACT

A local oscillation circuit comprising a crystal oscillating circuit for generating an output voltage having a constant frequency, and an interface part for converting the output voltage from the crystal oscillating circuit into a current signal, the current signal being used as a local oscillation signal to be mixed with the receiving signal from an antenna, whereby a receiving circuit, which can be made as a single semiconductor chip consuming little current, can be realized.

11 Claims, 9 Drawing Sheets

LOCAL OSCILLATION CIRCUIT AND A RECEIVING CIRCUIT INCLUDING THE LOCAL OSCILLATION CIRCUIT

BACKGROUND OF THE INVENTION

1. Field of the Invention

The present invention relates to a local oscillation circuit, without a phase locked loop (PLL) circuit, for providing an oscillating signal having a stable amplitude, and also relates to a receiving circuit, for mobile communication, including the local oscillation circuit.

2. Description of the Related Art

Receiving circuits include local oscillation circuits. In the prior art, local oscillation circuits include PLL circuits and oscillation circuits driven by the outputs of the PLL circuits. A PLL circuit and circuits other than an oscillator circuit may be integrated into one semiconductor chip. However, an oscillator circuit cannot be integrated into the semiconductor chip because an oscillator circuit includes many external parts such as variable capacitors, coils, capacitors, etc. Therefore, the prior-art local oscillation circuit has a problem in that it has a large number of circuit parts; the receiving circuit can not be made into one semiconductor chip; the size of the local oscillation circuit is large and, accordingly, the size of the receiving circuit is large.

SUMMARY OF THE INVENTION

In view of the above-mentioned problems in the prior art, an object of the present invention is to provide a receiving circuit which can be made as a single semiconductor chip by employing a voltage-current converting interface part in a local oscillation circuit in the receiving circuit so as to reduce the number of parts in the local oscillation circuit part.

Another object of the present invention is to provide a receiving circuit which consumes little current.

Still another object of the present invention is to provide a receiving circuit in which the sensitivity with respect to an input signal from an antenna is independent of the power supply voltage.

To attain the above objects, there is provided, according to the present invention, a local oscillation circuit comprising a crystal oscillating circuit-for generating an output voltage having a constant frequency, and an interface part for converting the output voltage from the crystal oscillating circuit into a current signal, the current signal being used as a local oscillation signal to be mixed with the receiving signal from an antenna.

Since no PLL circuit is included in the local oscillation circuit, the number of parts in the local oscillation circuit can be made small in comparison with the local oscillation circuit including the PLL circuit. Further, since the voltage is converted into a current, the fluctuation of the amplitude of the oscillating voltage can be limited even when a low pass filter and a voltage controlled oscillator (VCO) are not employed. Therefore, the local oscillation circuit can be operated even when the power supply voltage is a low voltage, so that a local oscillation circuit consuming little current can be realized, resulting in a long life of a battery in the circuit or in a miniaturization of the battery.

Preferably, the interface part comprises a constant current source for converting the output voltage from the crystal oscillating circuit into a square wave signal having a frequency corresponding to the frequency of the output voltage, a filtering part for removing high frequency components in the square wave signal output from the constant current source, and a current interface part for converting a change in the voltage of the signal close to a sine wave output from the filtering part into a change in current.

By employing the constant current source which can provide a constant gain even when the power supply voltage is low, the fluctuation of the current due to variations of the manufacturing processes can be limited so that the local oscillation circuit can be incorporated into a receiving circuit to provide a stable input sensitivity independent of the power supply voltage.

Still preferably, the constant current source comprises a constant current source part connected to a power supply line, a load connected to the ground, and a switching part, connected between the constant current source and the load, which can be turned ON or OFF in response to the output voltage from the crystal oscillating circuit. By this construction, a square wave voltage having a desired amplitude can be obtained across the load.

Further preferably, the constant current source comprises a differential pair of transistors connected to the power supply line, and a power source for supplying a constant current to the differential pair of transistors. The constant current is independent of the temperature. The switching part is a switching transistor connected between one of the differential pair of transistors and the load. By this construction, in response to the voltage output, from the crystal oscillating circuit, to be input into the switching transistor, a current flows through one of the differential pair of transistors and the load.

Still further preferably, the current interface part comprises a first differential pair including a first transistor having an input to receive the output voltage from the filtering part and a-second transistor having an input to receive a reference voltage, a current supplying source for supplying a current to the first transistor and the second transistor in response to the output voltage from the filtering part, and a second differential pair including a pair of a third transistor and a fourth transistor for differentially passing a current from the current supplying source in response to the operation of the first differential pair. In this construction, a current flowing through the second pair is the local oscillation signal.

According to another aspect of the present invention, there is provided a receiving circuit comprising the above-mentioned local oscillation circuit, an antenna for receiving a signal, and a mixer circuit for mixing the output current from the interface part with a receiving signal from the antenna.

Preferably, the mixing circuit comprises a local oscillation interface circuit for conducting a current in response to an output current of the interface part, a mixing part for mixing a receiving signal from the antenna with a current flowing through the local oscillation interface circuit; and an output circuit for conducting a constant current through the mixing part.

BRIEF DESCRIPTION OF THE DRAWINGS

The above objects and features of the present invention will be more apparent from the following description of the preferred embodiments when read in conjunction with the accompanying drawings, wherein.

DESCRIPTION OF THE PREFERRED EMBODIMENTS

For better understanding of the present invention, a prior-art local oscillation circuit and the problems therein will first be described.

Figure 8:
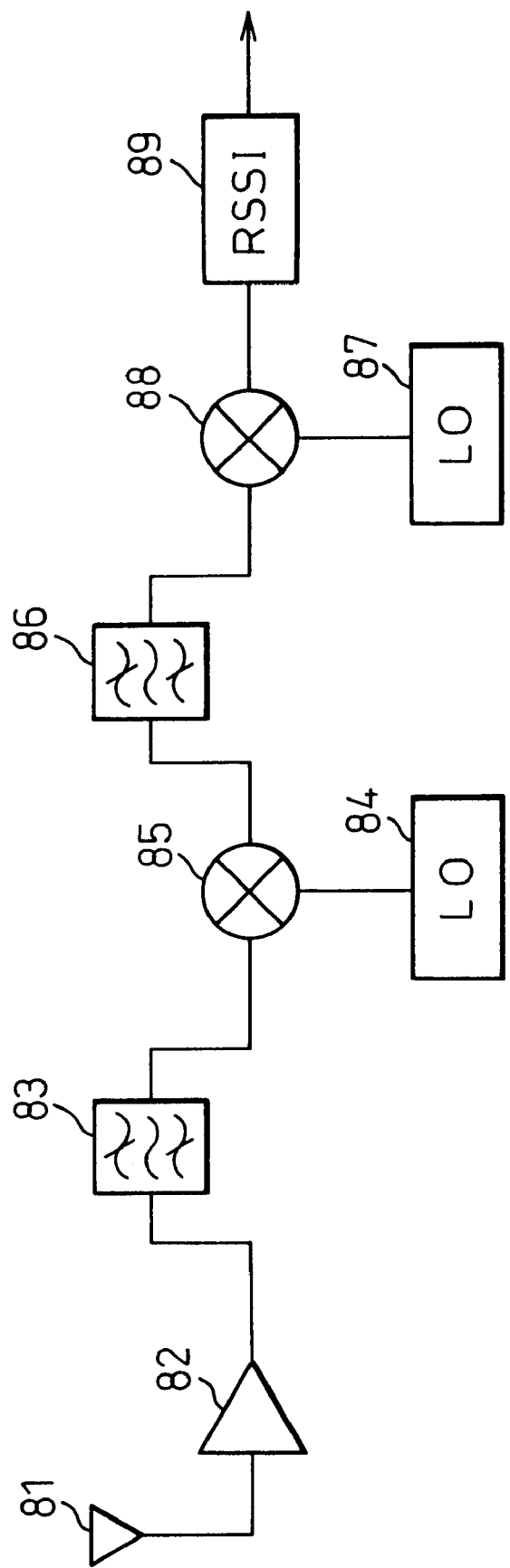
FIG. 8 is a block diagram showing an example of a prior-art receiving circuit.

FIG. 8 is a block diagram showing an example of a prior-art receiving circuit. In the figure, 81 is an antenna for receiving a signal, 82 is an input signal amplifying part (LNA) for amplifying an input signal, 83 is a first band-pass filter for passing only necessary signals, 84 is a first local oscillation circuit (LO), 85 is a first mixer circuit for outputting a signal having a constant frequency which is a difference between the frequency of the signal passed through the first band pass filter 83 and the frequency of the signal output from the first local oscillation circuit 84.

The frequency of the output signal from the first mixer circuit 85 is, for example, 130 MHz. From the first band pass filter 83, signals having frequencies near 800 MHz are input to the first mixer circuit 85. The frequencies of the signals are separated by 25 KHz for each channel. The first local oscillation circuit 84 gives a signal having a necessary frequency to the mixer circuit 85 so that the mixer circuit 85 outputs the signal having the above-mentioned constant frequency signal.

Reference numeral 86 represents a second band pass filter for passing a signal having the constant frequency of, for example, 130 MHz. Reference numeral 87 represents a second local oscillation circuit (LO). Reference numeral 88 represents a second mixer circuit. Reference numeral 89 represents a receive signal strength indicator (RSSI).

The second mixer circuit 88 outputs a signal having a constant frequency of, for example, 450 KHz. The frequency of the signal output from the second band pass filter 86 and input to the second mixer circuit 88 is, for example, 130 MHz. To obtain the constant frequency of 450 KHz at the output of the second mixer circuit 88, it is sufficient for the second local oscillation circuit 87 to output a signal having a constant frequency of, for example, 129.55 MHz.

Figure 9:
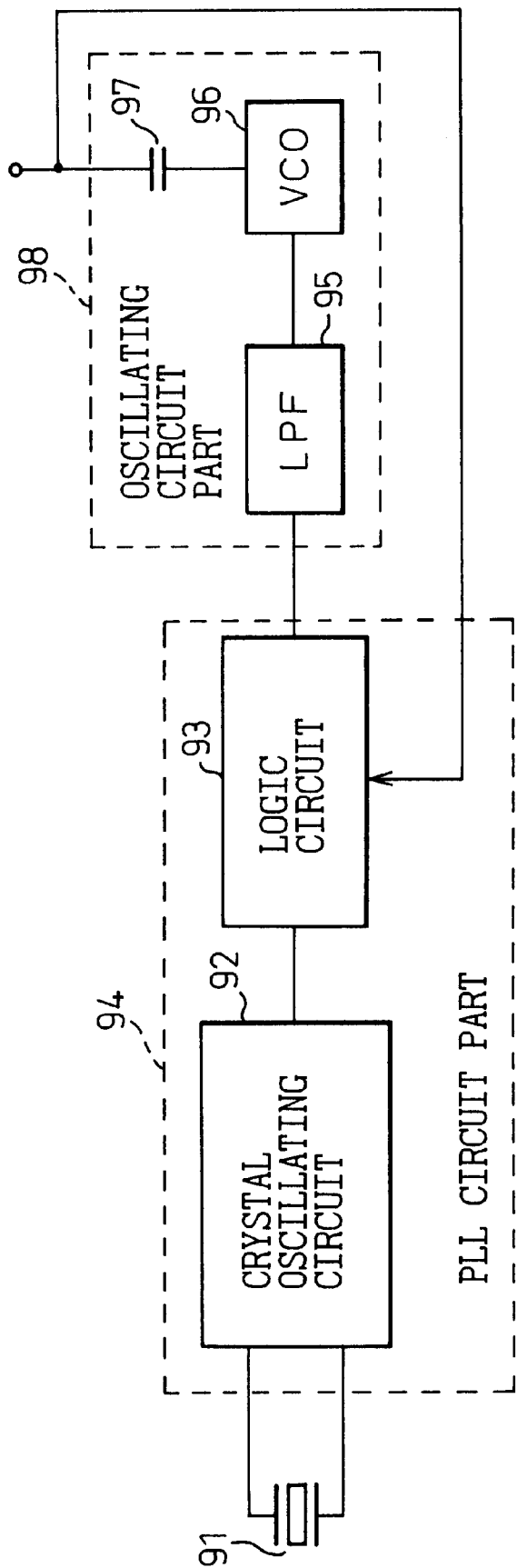
FIG. 9 is a block diagram showing a construction of a prior-art local oscillation circuit in the receiving circuit shown in FIG. 8.

FIG. 9 is a block diagram showing an example of the construction of the prior-art first local oscillation circuit 84 or the prior-art second local oscillation circuit 87 shown in FIG. 8. In FIG. 9, the prior art local oscillation circuit includes a PLL circuit part 94 which is driven by a crystal oscillator 91, and an oscillating circuit part 98 which is driven by the output of the PLL circuit part 94.

The PLL circuit part 94 includes a crystal oscillating circuit 92 for generating an oscillating signal based on the output signal from the crystal oscillator 91, and a logic circuit 93 driven by the output of the crystal oscillating circuit 92. The logic circuit 93 includes a prescaler which receives a signal from a voltage-controlled oscillator (VCO) circuit 96, a phase comparing circuit for comparing a divided signal from the crystal oscillating circuit 92 with a divided signal of the crystal oscillating signal. The details of the PLL circuit part 94 are well known, and therefore the prescaler and the phase comparing circuit are not shown in the drawings.

The oscillating circuit part 98 includes a low-pass filter (LPF) 95 for making the output voltage of the logic circuit 93 constant, and the voltage controlled oscillator (VCO) 96 for outputting a signal having a frequency proportional to the output voltage from the low-pass filter 95.

Figure 10:
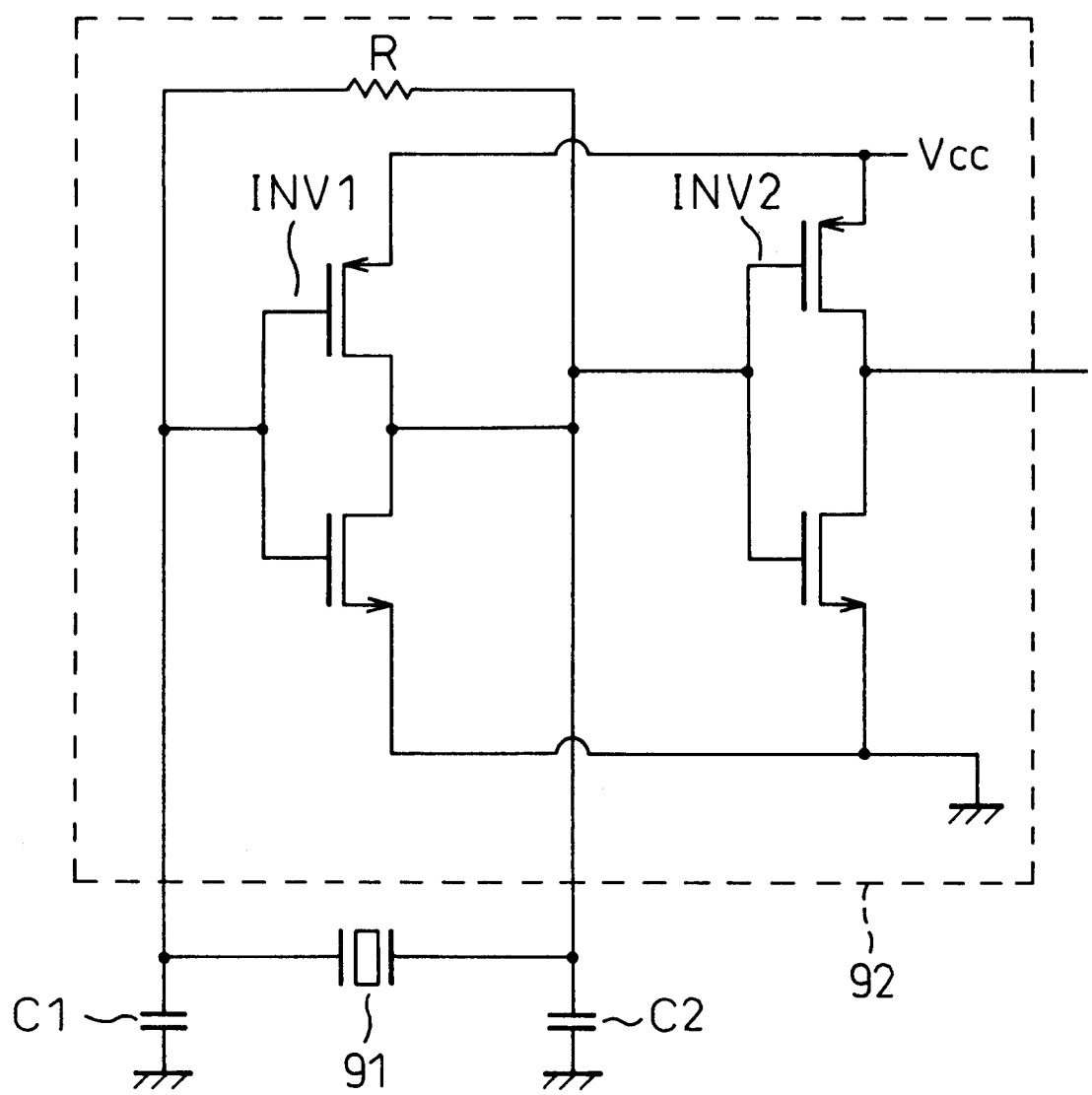
FIG. 10 is a circuit diagram of an inverter amplifier type which is an example of the crystal oscillating circuit shown in FIG. 9.

FIG. 10 is a circuit diagram of an inverter amplifier type which is an example of the crystal oscillating circuit 92 shown in FIG. 9. This crystal oscillating circuit includes a first complimentary metal oxide semiconductor (CMOS) inverter INVL connected to the crystal oscillator 91, a second CMOS inverter INV2 connected in series with the first CMOS inverter INV1, and a resistor R connected in parallel to the first CMOS inverter INV1.

The operations of the circuits shown in FIGS. 8–10 are well known in the art so that the description thereof is omitted here.

The prior-art local oscillation circuit shown in FIG. 9 has two blocks, i.e., the PLL circuit 94 and the oscillating circuit 98. The PLL circuit 94, and the other circuit elements in the receiving circuit in FIG. 8, that is, the input amplifier circuit 82, the first band pass filter 83, the first mixer circuit 85, the second band pass filter 86, the second mixer circuit 88, and the RSSI 89 shown in FIG. 8, can be formed as a single semiconductor chip. However, the oscillating circuit 98 is externally connected to the single semiconductor chip. This is because the VCO 96 in the oscillating circuit 98 includes a large number of external parts such as a variable capacitor, a coil, a capacitor, and so on, and the oscillating circuit 98 and the other circuits cannot be formed as a single semiconductor chip. Therefore, in the prior art, there are problems in that the number of the parts in the local oscillation circuit is large, the receiving circuit as a whole cannot be formed as a single semiconductor chip, the size of the local oscillation circuit is large, and the size of the receiving circuit as a whole is large.

In order to decrease the number of parts in the local oscillation circuit, it is possible to not employ the PLL circuit, but to directly use the frequency of the output signal from the crystal oscillating circuit 92 as the frequency of the local oscillation signal to be input into the mixer circuit 85 or 88. If such a circuit design is employed, however, the fluctuation of the amplitude of the oscillating voltage caused by the fluctuation of the power supply voltage can not be eliminated so that the voltage from the local oscillation signal input to the mixer circuit fluctuates, causing a problem in that the gain of the mixer circuit fluctuates.

Figure 11:
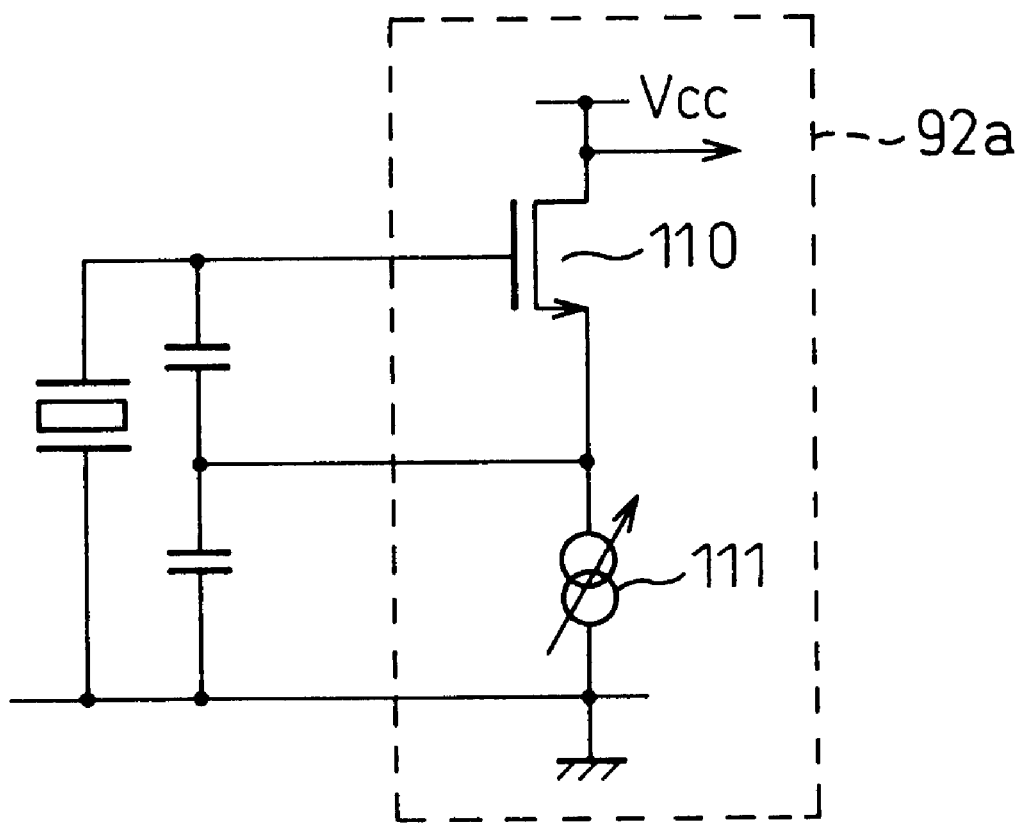
FIG. 11 is a circuit diagram of an example of a Colpits oscillator circuit of an analog circuit.

It is also possible to employ a Colpits oscillator circuit 92a of an analog circuit shown in FIG. 11 instead of the inverter-amplifier type as shown in FIG. 10. In FIG. 11, the Colpits oscillator circuit 92a includes a transistor 110 and a current source 111 connected in series between a power supply line Vcc and the ground. In this circuit, because of the presence of the constant current source 111, a constant current flows through the transistor. However, the current flowing through the transistor is so large that this power consumption becomes very large, disadvantageously resulting in that not only the life of a battery in the receiving circuit becomes short, but also the size of the transistor becomes as large as 100 times the size of an inverter amplifier type transistor. Further, in the Colpits oscillator, the value of a negative resistance which causes the oscillation to stop is very small. That is, the manufacturing margin is very small.

From another point of view, in the prior-art receiving circuit shown in FIG. 8, it is necessary to change the frequency of the signal output from the first local oscillation circuit 84, however, it is not necessary to change the frequency of the output signal from the second local oscillation circuit 87. Accordingly, the second local oscillation circuit 87 may not be constructed by a PLL circuit.

Now, an embodiment of the present invention will be described.

Figure 1:
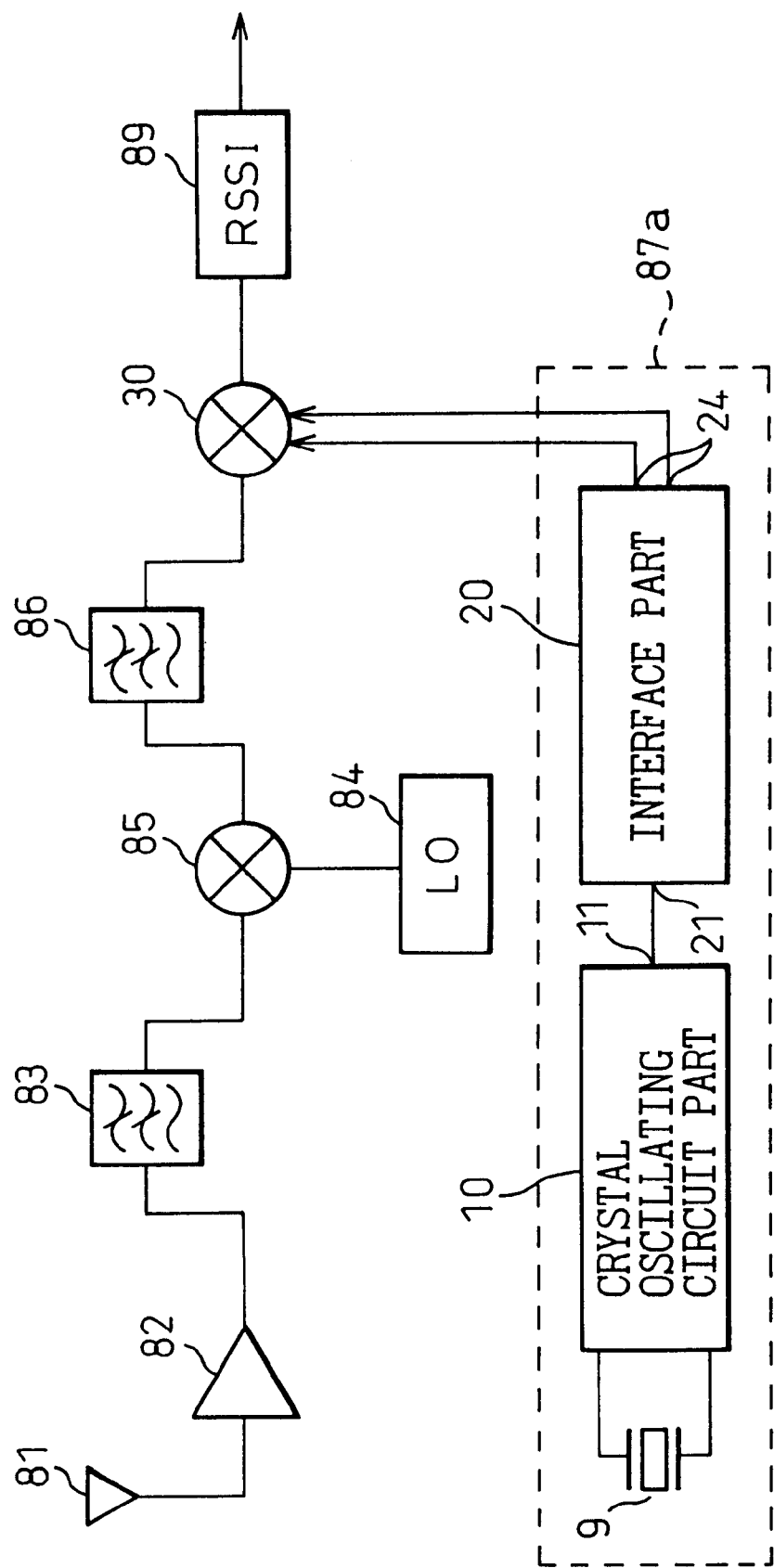
FIG. 1 is a block diagram showing a receiving circuit according to an embodiment of the present invention.

FIG. 1 is a block diagram showing a receiving circuit according to an embodiment of the present invention. In the figure, the same reference numerals as in FIG. 8 represent the same parts. The main differences between FIG. 1 and FIG. 8 reside in that, according to the invention, in place of the second local oscillation circuit 87 in FIG. 8, a local oscillation circuit 89a including a crystal oscillating circuit 10 and an interface part 20 is provided in FIG. 1. Further, in place of the second mixer circuit 88 in FIG. 8, a mixer circuit 30 having a current interface is provided in FIG. 1. A reference numeral 11 represents an output terminal of the crystal oscillating circuit 10; a reference numeral 21 represents an input terminal of the interface part 20; and a reference numeral 24 represents an output terminal of the interface part 20.

In operation, a crystal oscillating circuit 10 generates an output voltage having a fixed frequency. The interface part 20 converts a voltage change in the voltage output from the crystal oscillating circuit 10 into a current change. The mixer circuit 30 mixes the converted current output from the interface part 20 with the received signal from the antenna 81.

Figure 2:
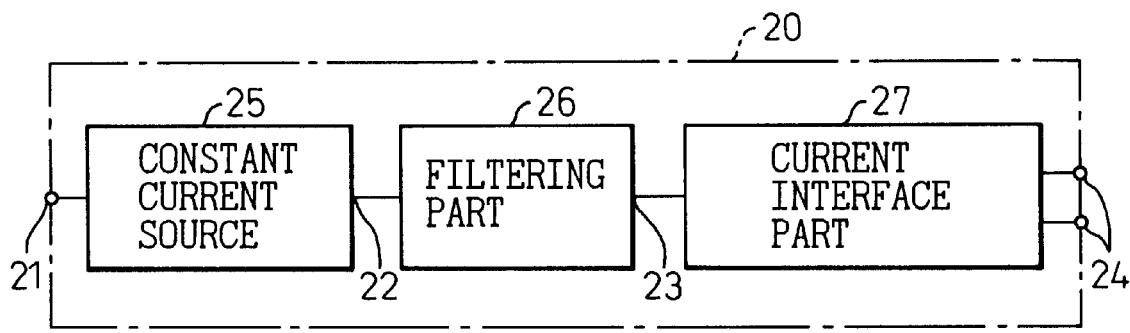
FIG. 2 is a block diagram showing in detail the construction of an interface part in the receiving circuit shown in FIG. 1.

FIG. 2 is a block diagram showing in detail the interface part 20 in the receiving circuit shown in FIG. 1. In the figure, the interface part 20 includes a constant current source 25, a filtering part 26, and a current interface part 27. Reference numeral 22 represents an output terminal of the constant current source 25; and a reference numeral 23 represents an output terminal of the filtering part 26.

The constant current source 25 receives, at its input terminal 21, the output voltage from the crystal oscillating circuit 10 and converts the output voltage into a square-wave signal having a frequency proportional to the frequency of the output signal. The filtering part 26 cuts high frequency components in the square-wave signal output from the constant current source 25 so as to output a signal close to a sine wave. The current interface part 27 converts the voltage change in the signal, which is the output of the filtering part 26 and which is close to the sine wave, into a change in current.

Figure 3:
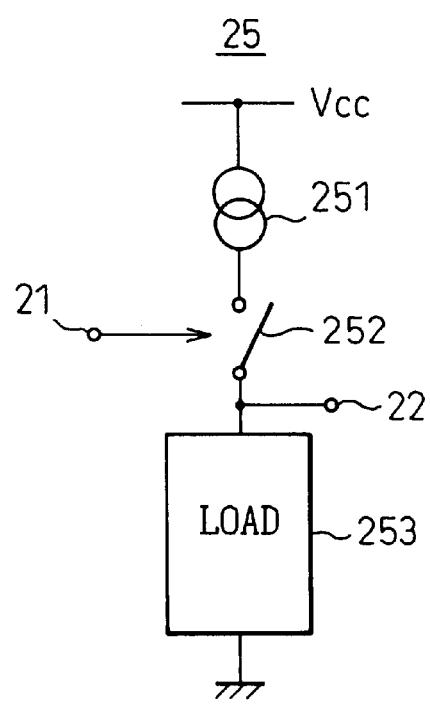
FIG. 3 is a circuit diagram showing an example of a constant current source in the interface part shown in FIG. 2.

FIG. 3 is a circuit diagram showing an example of the circuit of the constant current source 25 shown in FIG. 2. In the figure, the constant current source 25 includes a constant current source part 251 connected to the power supply line Vcc, a switching part 252 having a terminal connected to the constant current source part 251 and driven in response to the output voltage of the crystal oscillating circuit 10 (see FIG. 1), and a load 253 connected between another terminal of the switching part 252 and the ground. Across the load 253, a square-wave voltage having a desired width and amplitude can be obtained.

Figure 4:
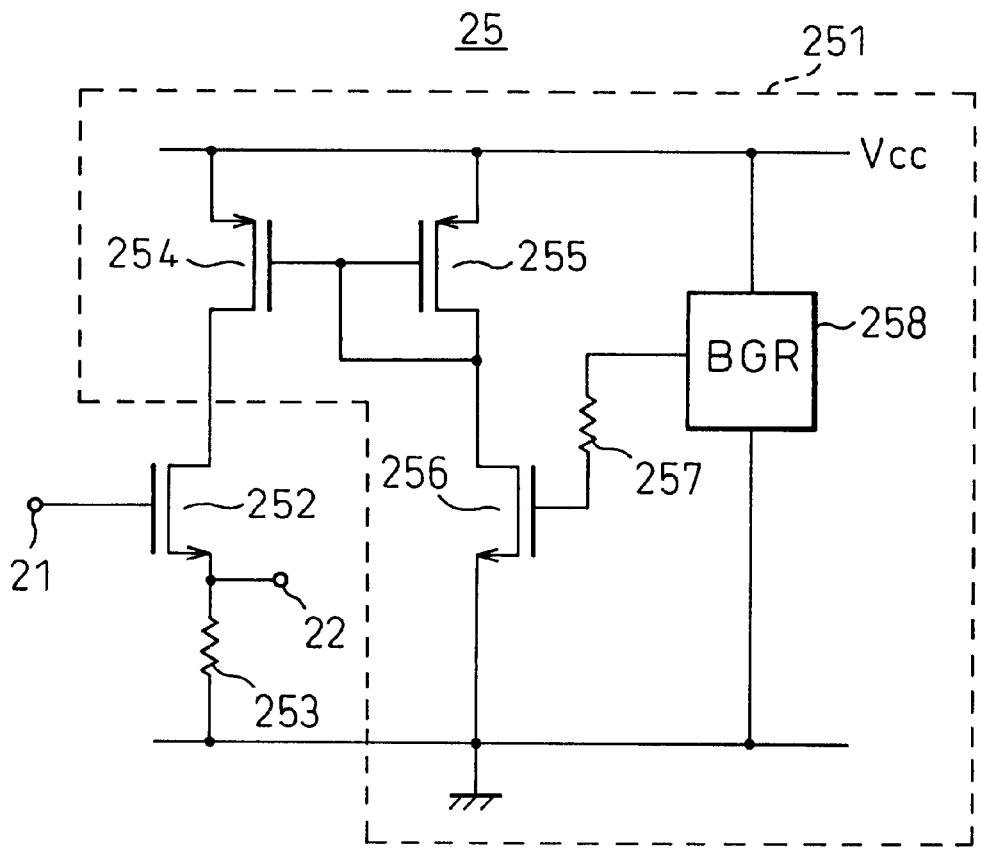
FIG. 4 is a circuit diagram showing a practical example of the constant current source shown in FIG. 3.

FIG. 4 is a circuit diagram showing an example of the practical circuit of the constant current source 25 shown in FIG. 3. In the figure, the constant current source 251 includes a differential pair of P-channel transistors 254 and 255, and a band gap reference (BGR) circuit 258 which is a voltage source for outputting a constant reference voltage independent of the temperature. The output of the BGR circuit 258 is connected through the resistor 257 to the gate of an N-channel transistor 256. The drain of the transistor 256 is connected to the gates of the transistors 254 and 255. The source of the transistor 256 is connected to the ground. The switching part 252 shown in FIG. 2 is realized by an N channel switching transistor 252 connected between one transistor 254 of the differential pair of transistors and the load resistor 253.

In operation of the circuit 25 shown in FIG. 4, since a constant voltage independent of the temperature is applied to the gate of the transistor 256, a constant current always flows through the transistor 256. Since the differential pair of the transistors 254 and 255 constitute a current mirror circuit, the current flowing through the transistor 256 is the same as the current flowing through the transistor 252 when the transistor 252 is in an ON state. As a result, a voltage with a constant amplitude independent from the temperature can be obtained across the load resistor 253. It should be noted that the switching transistor 252 is in the ON state to provide the constant amplitude voltage across the load resistor 253 only when the voltage output from the crystal oscillating circuit 10 exceeds a predetermined level. From the above description, it will be apparent that a square-wave voltage, which is independent of the power supply voltage fluctuation and the frequency of which is proportional to the oscillating frequency, can be obtained across the load resistor 253.

Figure 5:
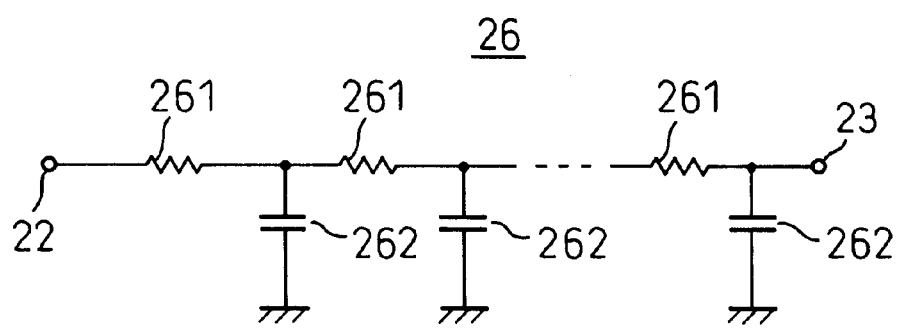
FIG. 5 is a circuit diagram showing a practical circuit construction of a filter in the interface circuit shown in FIG. 2.

FIG. 5 is a circuit diagram showing a practical circuit construction of the filtering part 26 in the receiving circuit 20 shown in FIG. 2. As is well known, the filtering part 26 includes a plurality of resistors 261 and a plurality of capacitors 262, constituting a low-pass filter (LPF). When the square-wave signal output from the constant current source 25 shown in FIG. 4 is applied to an input terminal 22 of the filtering part 26, a shaped signal having a wave form close to a sine wave is output from an output terminal 23 of the filtering part 26. When this output signal is input into a mixer part 30 (see FIG. 1), the generation of harmonics of the square wave can be suppressed so that interference does not occur.

Figure 6:
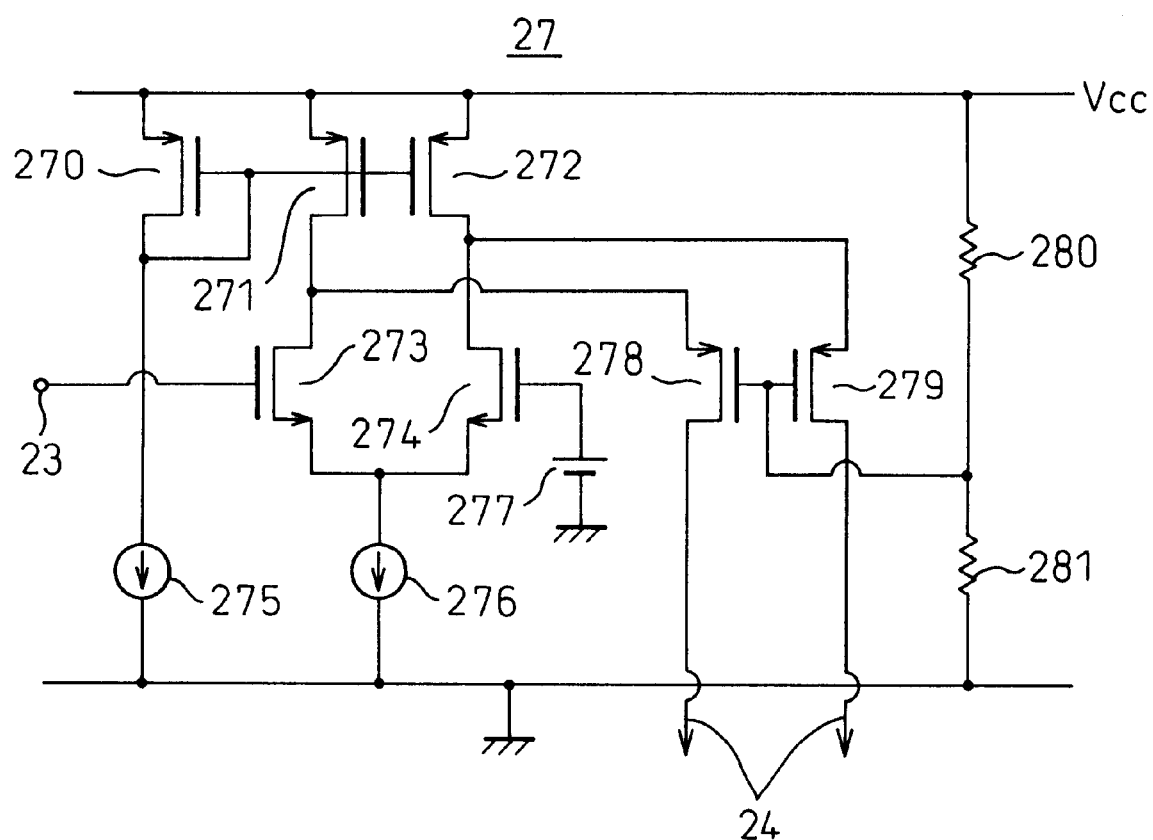
FIG. 6 is a circuit diagram showing a practical circuit construction of a current interface part in the interface part shown in FIG. 2.

FIG. 6 is a circuit diagram showing a practical circuit construction of the current interface part 27 in the interface part 20 shown in FIG. 2. In the figure, the current interface part 27 includes a first differential pair of transistors consisting of an N channel transistor 273 having a gate for receiving an output voltage from the output terminal 23 of the filtering circuit 26 and an N channel transistor 274 having a gate for receiving a reference voltage from a reference voltage source 277 which is formed by a voltage source such as the BGR circuit for outputting a constant reference voltage independent from the temperature, a current supplying source 276 for supplying a constant current to the first pair of transistors, and a second differential pair of transistors consisting of a pair of a P channel transistor 278 and a P channel transistor 279 which functions as a current mirror to differentially pass the current from the current supply source 276 in response to the operation of the first differential pair of transistors. P channel transistors 270, 271, and 272 are load resistors constituting the current mirror. The source of the transistor 270 is connected to the power supply line Vcc; its drain is connected through the current source 275 to the ground; and its gate is connected to the drain. The source of the transistor 271 is connected to the power supply line Vcc; and its drain is connected to the drain of the N channel transistor 273. The source of the transistor 272 is connected to the power supply line Vcc; and its drain is connected to the drain of the N channel transistor 274. The gates of the transistors 270, 271, and 272 are connected together. The gate and the drain of the transistor 270 are connected to each other. The source of the transistor 273 and the source of the transistor 274 are connected through the current source 276 to the ground. The source of the transistor 278 is connected to the drain of the transistor 272. To the gates of the transistors 278 and 279 is connected a constant voltage obtained by dividing the power supply voltage by means of the resistors 280 and 281 connected in series between the power supply line Vcc and the ground.

The drains of the transistors 278 and 279 are connected to the output terminals 24 of this current interface part 27.

In the operation of the circuit shown in FIG. 6, by means of the constant current source 275, a constant current flows through the P channel transistor 270. In response to the voltage of the signal output from the filtering part 26 to be applied to the input terminal 23, the N channel transistor 273 is turned ON or OFF. In response to this change, the constant current flows through either one of the transistors 273 and 274 from the current source 276. When the transistor 273 is in an OFF state, the current flows through the transistor 278; and when the transistor 274 is in an OFF state, the current flows through the transistor 279. Thus, the voltage change at the input terminal 23 is converted into a current change at the output terminals 24. This current change is input into the mixer circuit 30 shown in FIG. 1.

Figure 7:
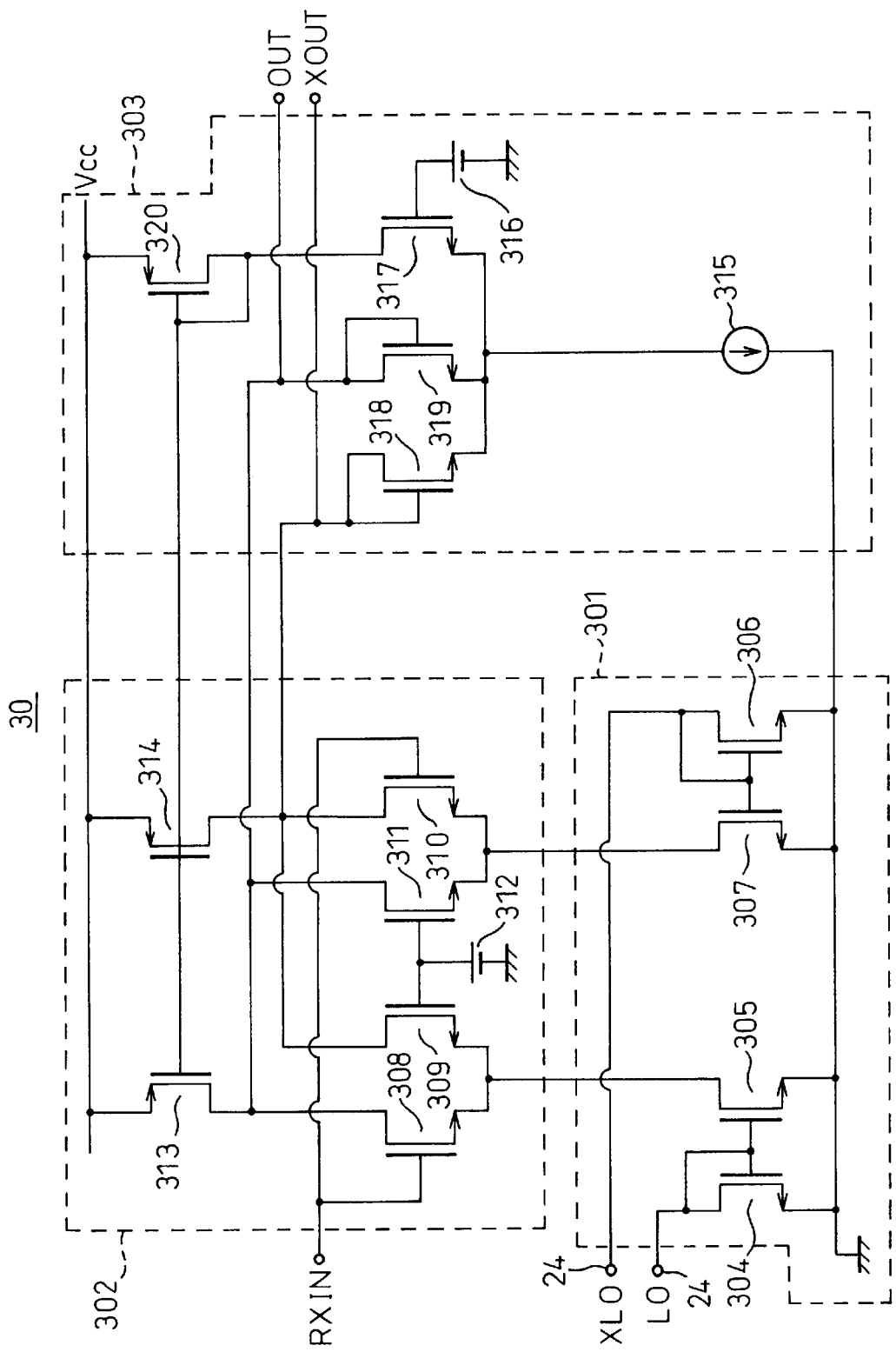
FIG. 7 is a circuit diagram showing a practical construction of a mixing circuit shown in the receiving circuit shown in FIG. 1.

FIG. 7 is a circuit diagram showing a practical circuit construction of the mixer circuit 30 in the receiving circuit shown in FIG. 1. In the figure, the mixer circuit 30 includes a local oscillation interface circuit 301, a mixing part 302, and an output circuit part 303.

The local oscillation interface circuit 301 includes a pair of N channel transistors 304 and 305, and a pair of N channel transistors 306 and 307. The drain and the gate of the transistor 304 are connected to one (LO) of the output terminals 24 of the interface part 20. The source of the transistor 304 is connected to the ground. The gate of the transistor 305 is connected to the gate of the transistor 304. The source of the transistor 305 is connected to the ground. The drain and the gate of the transistor 306 are connected to the other (XLO) of the output terminals 24 of the interface part 20. The source of the transistor 306 is connected to the ground. The gate of the transistor 307 is connected to the gate of the transistor 306. The source of the transistor 307 is connected to the ground.

The mixing part 302 includes a pair of N channel transistors 308 and 309, a pair of transistors 310 and 311, a reference voltage source 312, formed by a BGR and so forth, for outputting a constant reference voltage independent from the temperature, and a pair of P channel load transistors 313 and 314.

To the gates of the transistor 308 and the transistor 310, a high frequency signal RXIN output from the local oscillation interface circuit 301 is applied. The sources of the transistors 308 and 309 are connected to the drain of the N channel transistor 305 in the local oscillation interface circuit 301. To the gates of the transistors 309 and 311, the reference voltage from the reference voltage source 312 is applied. The drains of the transistors 308 and 311 are connected through the load transistor 313 to the power supply line Vcc. The drains of the transistors 309 and 310 are connected through the load transistor 314 to the power supply line Vcc.

The output circuit part 303 includes a reference voltage source 316 formed by a BGR and so forth for outputting a constant reference voltage independent from the temperature, an N channel transistor 317, a pair of N channel transistors 318 and 319, and a load transistor 320.

The constant voltage from the reference voltage source 316 is applied to the gate of the transistor 317. The sources of the transistors 317 to 319 are connected through the constant current source 315 to the ground. The drain of the transistor 317 is connected to the drain and the gate of the load transistor 320. The gates of the load transistors 313, 314, and 320 are connected together. The sources of the transistors 313, 314 and 320 are connected to the power supply line Vcc. The drain and the gate of the transistor 318 are connected to the drains of the transistors 309 and 310 in the mixing circuit 302 and to one output terminal XOUT of this mixing circuit 30. The drain and the gate of the transistor 319 is connected to the other output terminal OUT of this mixing circuit 30.

In the operation of the circuit shown in FIG. 7, by means of the output circuit part 303, constant currents always flow through the transistors 318 and 319 respectively. Each of the constant currents is the same as the current flowing through the transistor 317. The currents flowing through the transistors 305 and 307 respectively are determined in response to the level of the output signals XLO and LO which are output from the interface part 20. On the other hand, in response to the output signal RXIN from the second band pass filter 86, the currents flowing through the transistors 308 and 310 and the currents flowing through the transistors 309 and 311 are determined. As a result, at the output terminal OUT connected to the drains of the transistors 308 and 311, a mixed signal of the output signal RXIN of the second band pass filter 86 and the output signal LO of the interface part 20 can be obtained; and at the output terminal XOUT connected to the drains of the transistors 309 and 310, a mixed signal of the output signal RXIN of the second band pass filter 86 and the output signal XLO of the interface part 20 can be obtained.

From the foregoing description, it will be apparent that, according to the present invention, the PLL circuit is not employed in the local oscillation circuit so that the number of parts in the local oscillation circuit can be reduced in comparison with the circuit employing a PLL circuit. As a result, a receiving circuit as a whole can be made of a single semiconductor chip.

Further, according to the present invention, since the interface between circuits has been changed from a voltage interface to a current interface, the fluctuation of the amplitude of the oscillating voltage due to the fluctuation of the power supply voltage can be suppressed. Therefore, a receiving circuit with a reduced power consumption can be realized so that the life time of the battery can be long or the battery can be miniaturized.

Still further, a constant current source circuit according to the present invention can provide a constant gain even when the power supply voltage is low so that the current does not fluctuate even when characteristics of parts in the receiving circuit may fluctuate due to variations of the manufacturing processes. Therefore, in the receiving circuit according to the present invention, the sensitivity with respect to the input signal from the antenna is stable and independent of the power supply voltage.

What is claimed is:

1. A local oscillation circuit comprising:
   a crystal oscillating circuit for generating an output voltage having a constant frequency; and
   an interface part for converting the output voltage from said crystal oscillating circuit into a current signal, said current signal being used as a local oscillation signal to be mixed with the receiving signal from an antenna.

2. The local oscillation circuit of claim 1 wherein:
   said interface part comprises:
      a constant current source for converting the output voltage from said crystal oscillating circuit into a square wave signal having a frequency corresponding to the frequency of said output voltage;
      a filtering part for removing high frequency components in the square wave signal output from said constant current source; and
      a current interface part for converting a change in the voltage of the signal close to a sine wave output from said filtering part into a change in current.

3. The local oscillation circuit of claim 2 wherein:
   said constant current source comprises:
      a constant current source part connected to a power supply line;
      a load connected to the ground; and
      a switching part, connected between said constant current source and said load, for turning ON or OFF in response to the output voltage from said crystal oscillating circuit;
      whereby a square wave voltage having a desired amplitude can be obtained across said load.

4. The local oscillation circuit of claim 3 wherein:
   said constant current source comprises:
      a differential pair of transistors connected to said power supply line; and
      a power source for supplying a constant current to said differential pair of transistors;
      said constant current being independent of a temperature; and
      said switching part being a switching transistor connected between one of said differential pair of transistors and said load; whereby
      in response to the voltage output from said crystal oscillating circuit to be input into said switching transistor, a current flows through one of said differential pair of transistors and said load.

5. The local oscillation circuit of claim 2 wherein:
   said current interface part comprises:
      a first differential pair including a first transistor having an input to receive the output voltage from said filtering part and a second transistor having an input to receive a reference voltage;
      a current supplying source for supplying a current to said first transistor and said second transistor in response to the output voltage from said filtering part; and
      a second differential pair including a pair of a third transistor and a fourth transistor for differentially passing a current from said current supplying source in response to the operation of said first differential pair; wherein
      a current flowing through said second pair is said local oscillation signal.

6. A receiving circuit comprising:
   a local oscillation circuit;
      an antenna for receiving a signal; and
      a mixer circuit for mixing the output current from said interface part with a receiving signal from said antenna;
   said local oscillation circuit comprising:
      a crystal oscillating circuit for generating an output voltage having a constant frequency; and
      an interface part for converting the output voltage from said crystal oscillating circuit into a current signal, said current signal being used as a local oscillation signal to be mixed with the receiving signal from an antenna.

7. The receiving circuit of claim 6 wherein:
   said interface part comprises:
      a constant current source for converting the output voltage from said crystal oscillating circuit into a square wave signal having a frequency corresponding to the frequency of said output voltage;
      a filtering part for removing high frequency components in the square wave signal output from said constant current source; and
      a current interface part for converting a change in the voltage of the signal close to a sine wave output from said filtering part into a change in current.

8. The receiving circuit of claim 7 wherein:
   said constant current source comprises:
      a constant current source part connected to a power supply line;
      a load connected to the ground; and
      a switching part, connected between said constant current source and said load, for turning ON or OFF in response to the output voltage from said crystal oscillating circuit;
      whereby a square wave voltage having a desired amplitude can be obtained across said load.

9. The receiving circuit of claim 8 wherein:
   said constant current source comprises:
      a differential pair of transistors connected to said power supply line; and
      a power source for supplying a constant current to said differential pair of transistors;
      said constant current being independent from a temperature; and
      said switching part being a switching transistor connected between one of said differential pair of transistors and said load; whereby
      in response to the voltage output from said crystal oscillating circuit to be input into said switching transistor, a current flows through one of said differential pair of transistors and said load.

10. The local oscillation circuit of claim 7 wherein:
    said current interface part comprises:
       a first differential pair including a first transistor having an input to receive the output voltage from said filtering part and a second transistor having an input to receive a reference voltage;
       a current supplying source for supplying a current to said first transistor and said second transistor in response to the output voltage from said filtering part; and a second differential pair including a pair of a third transistor and a fourth transistor for differentially passing a current from said current supplying source in response to the operation of said first differential pair; wherein a current flowing through said second pair is said local oscillation signal.

11. The receiving circuit of claim 10 wherein:

said mixing circuit comprises:

a local oscillation interface circuit for conducting a current in response to an output current of said interface part;

a mixing part for mixing a receiving signal from said antenna with a current flowing through said local oscillation interface circuit; and an output circuit for conducting a constant current through said mixing part.

* * * * *